(12) United States Patent
Furuya et al.

(10) Patent No.: US 8,379,375 B2
(45) Date of Patent: Feb. 19, 2013

(54) POWER SOURCE CIRCUIT SHUT OFF DEVICE

(75) Inventors: Yoshinobu Furuya, Makinohara (JP); Hirotaka Hasegawa, Makinohara (JP); Hiroshi Fukuda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/552,854

(22) Filed: Jul. 19, 2012

(65) Prior Publication Data

US 2012/0279834 A1 Nov. 8, 2012

Related U.S. Application Data

(63) Continuation of application No. PCT/JP2011/072894, filed on Oct. 4, 2011.

(30) Foreign Application Priority Data

Oct. 6, 2010 (JP) ................................. 2010-226351

(51) Int. Cl.
*H02B 1/20* (2006.01)
(52) U.S. Cl. .................. 361/642; 200/17 R; 200/43.01; 200/51.09; 200/334; 361/626; 361/646; 361/649; 361/833
(58) Field of Classification Search ............... 200/43.01, 200/43.02, 43.04, 17 R, 43.05, 43.09, 51 R, 200/334, 51.09; 361/642, 626, 646, 649, 361/833; 337/194, 198
See application file for complete search history.

(56) References Cited

U.S. PATENT DOCUMENTS

| | | | | |
|---|---|---|---|---|
| 5,347,095 A | * | 9/1994 | Zeder | ........................ 200/51.09 |
| 6,333,846 B1 | | 12/2001 | Hashizawa et al. | |
| 6,366,449 B1 | | 4/2002 | Hashizawa et al. | |
| 6,802,741 B1 | * | 10/2004 | Shatkin | .................... 439/620.21 |
| 6,979,787 B2 | * | 12/2005 | Davies | ........................ 200/51 R |
| 7,184,258 B2 | * | 2/2007 | Lai | ................................ 361/641 |
| 8,278,573 B2 | * | 10/2012 | Chuang | ....................... 200/17 R |
| 2005/0098419 A1 | | 5/2005 | Matsui et al. | |
| 2006/0137962 A1 | * | 6/2006 | Schluter et al. | ............. 200/51 R |

FOREIGN PATENT DOCUMENTS

| | | |
|---|---|---|
| JP | 2000-311576 A | 11/2000 |
| JP | 2000-322983 A | 11/2000 |
| JP | 2002-298704 A | 10/2002 |
| JP | 2003-16880 A | 1/2003 |
| JP | 2005-142107 A | 6/2005 |

OTHER PUBLICATIONS

Written Opinion (PCT/ISA/237) of the International Searching Authority, issued on Nov. 1, 2011 in corresponding International Application No. PCT/JP2011/072894.
International Search Report (PCT/ISA/210), issued on Nov. 1, 2011 by the International Searching Authority in corresponding International Application No. PCT/JP2011/072894.

* cited by examiner

*Primary Examiner* — Gary F. Paumen
(74) *Attorney, Agent, or Firm* — Sughrue Mion, PLLC (57) ABSTRACT

A power source circuit shut off device includes a plug having a terminal metal fitting and a housing to which the terminal metal fitting is attached, and a plug attachment section having a second terminal metal fitting and a second housing to which the second terminal metal fitting is attached. The housing has a second opening section at its side face perpendicular to its bottom face at a second housing side, the second opening section being adapted for attaching the terminal metal fitting to the housing. The terminal metal fitting and the second terminal metal fitting are connected to the second housing. The second housing has a closing wall which closes the second opening section in a state that the housing is positioned at the terminal contact position at which the housing is not yet accommodated in the second housing.

3 Claims, 6 Drawing Sheets

POWER SOURCE CIRCUIT SHUT OFF DEVICE

CROSS REFERENCE TO RELATED APPLICATION

This application is a continuation of PCT application No. PCT/JP2011/072894, which was filed on Oct. 4, 2011 based on Japanese Patent Application (No. 2010-226351) filed on Oct. 6, 2010, the contents of which are incorporated herein by reference. Also, all the references cited herein are incorporated as a whole.

BACKGROUND

1. Technical Field

The present invention relates to a power source circuit shut off device, and particularly relates to a power source circuit shut off device (a service plug) that shuts off a current by opening a power source circuit.

2. Background Art

In the past, a power source circuit shut off device (a service plug) is mounted on an electric vehicle and is built in a power source circuit which is adapted to supply power to a load from a battery and opens or closes the power source circuit on an as-needed basis. A capacity of a power source as a battery of an electric vehicle having, mounted thereon, the above kind of power source circuit shut off device, is markedly higher as compared to those of regular gasoline engine vehicles and the like. Therefore, in a case where the power source circuit shut off device is to be mounted on a vehicle, a current is shut off in a state that a power source circuit is opened (shut off) (see, e.g., JP-A-2000-322983).

Figure 9:
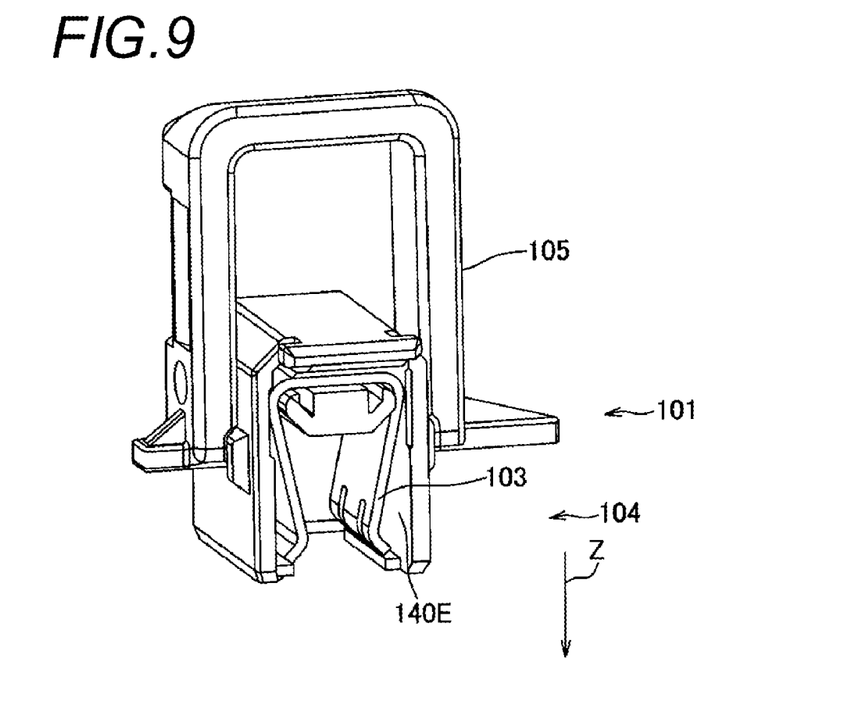
FIG. 9 is a perspective view showing a plug constituting a related art power source circuit shut off device.
Figure 10:
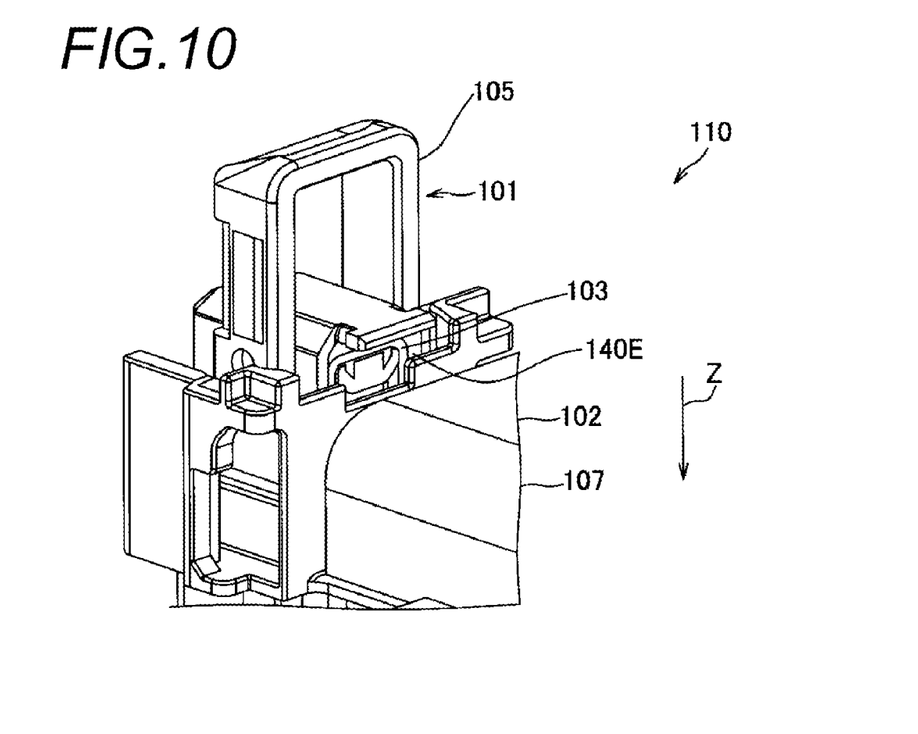
FIG. 10 is a perspective view showing a situation in which the plug constituting the power source circuit shut off device shown in FIG. 9 is attached to the plug attachment section to which the plug is to be attached.

FIG. 9 is a perspective view showing a plug constituting a related power source circuit shut off device. FIG. 10 is a perspective view showing a situation in which the plug constituting the power source circuit shut off device shown in FIG. 9 is going to be attached to a plug attachment section to which the plug is to be attached.

As shown in FIGS. 9 and 10, the above described power source circuit shut off device 110 includes the plug 101 having a terminal metal fitting 103, a housing 104 provided with an opening section 140E which is adapted to allow the terminal metal fitting 103 to be attached and a lever 105 to be rotatably attached to the housing 104, and the plug attachment section 102 having a second terminal metal fitting (not shown) to be connected to the terminal metal fitting 103 and a second housing 107 to which the second terminal metal fitting is to be attached. The housing 104 is brought into close proximity to the housing 107. In association with rotation of the lever 105, from a terminal contact position at which a tip portion of the second terminal metal fitting is first brought into contact with the terminal metal fitting 103 before the tip portion is accommodated in the second housing, the tip portion of the second terminal metal fitting is advanced into the innermost side of the terminal metal fitting 103, and then the housing 104 is accommodated in the second housing 107 and the housing 104 is position on a complete fitting position at which the opening section 140E is closed by the second housing 107. That is, in a state that the housing 104 is positioned at the terminal contact position, the terminal metal fitting 103 connected to the second terminal metal fitting is exposed from the opening section 140E provided on the housing 104. Meanwhile, a direction of arrow Z shown in FIGS. 9 and 10, indicates a direction that the housing 104 is brought into close proximity to the second housing 107.

The rotation of the lever 105 is restricted on the terminal contact position and in a half fitting state in which the housing 104 is positioned between the terminal contact position and the complete fitting position before the housing 104 is positioned at the complete fitting position from the terminal contact position with respect to the second housing 107. In a case where the lever 105 is rotated in a state that the housing 104 and the second housing 107 are positioned at the terminal contact position or in the half fitting state, the rotation of the lever 105 is restricted. Therefore, an operator may stop the operation of rotating the lever 105, further bring the housing 104 into close proximity to the second housing 107 so as to position the housing 104 on the complete fitting position, and then the operator needs to rotate the lever 105.

However, the above related power source circuit shut off device 110 has the following problems. That is, the housing 104 provided at the related power source circuit shut off device 110 has the opening section 140E which is adapted to allow the terminal metal fitting 103 to be attached. The terminal metal fitting 103 attached to the housing 104 is exposed from the opening section 140E at the terminal contact position at which the housing 104 is brought into close proximity to the second housing 107 so that the tip portion of the second terminal metal fitting is first brought into contact with the terminal metal fitting 103 before the housing 104 is accommodated in the second housing 107. Therefore, in a case where an operator mounts the power source circuit shut off device 110, the operator may erroneously contact the terminal metal fitting 103 connected to the second terminal metal fitting so as to possibly receive an electric shock.

SUMMARY

With the above circumstances, a purpose of the invention is to provide a power source circuit shut off device capable of preventing an operator from receiving an electric shock.

The purpose of the invention can be achieved by the following configurations.

(1) A power source circuit shut off device includes a plug having a terminal metal fitting and a housing to which the terminal metal fitting is attached; and a plug attachment section having a second terminal metal fitting to be connected to the terminal metal fitting and a second housing to which the second terminal metal fitting is attached, wherein a first opening section for inserting the second terminal metal fitting is provided at a bottom face of the housing at a second housing side; wherein the housing has a second opening section for attaching the terminal metal fitting to the housing, the second opening section being provided on a side face of the housing perpendicular to the bottom face; wherein the housing is brought into close to the second housing, and a tip portion of the second terminal metal fitting is advanced into the innermost side of the terminal metal fitting from a terminal contact position at which the tip portion of the second terminal metal fitting is first brought into contact with the terminal metal fitting before the housing is accommodated in the second housing, and thereby the housing is positioned at a complete fitting position at which the housing is accommodated in the second housing and the second opening section is closed by the second housing; and wherein a closing wall is provided so as to protrude from an edge of an insertion hole through which the housing is inserted into the second housing, and closes the second opening section in a state that the housing is positioned at the terminal contact position.

(2) In the power source circuit shut off device having the configuration of the aspect (1), wherein a lever is rotatably attached to the housing; wherein a pair of projection sections is provided on the housing and protrudes in the directions of mutually separating from each other for attaching the lever to the housing; wherein a pair of abutment shafts is provided on the plug attachment section and protrudes in the directions of mutually separating from overlapping walls overlapped with outer walls respectively having the projection sections; wherein the abutment shafts are provided at positions which are brought into contact with outer edges of the lever when the lever is rotated from the terminal contact position; wherein the lever is provided so as to be rotated in a state that the abutment shafts are in contact with the outer edges; and wherein the abutment shafts are positioned at the sides in the directions of separating away more than the projection sections in a state that the housing is positioned at the complete fitting position.

(3) In the power source circuit shut off device having the configuration of the aspect (1) or (2), the lever is provided so as to be slidable with respect to the housing and the second housing accommodating the housing in a state that the housing is positioned at the complete fitting position, and a pair of pin reception terminals are disposed so as to have an interval therebetween on a power source line from a battery to a load and are attached to the second housing; wherein a pin terminal is attached to the lever and connects the pair of pin reception terminals with each other; and wherein when the lever is slid in a state that the housing is positioned at the complete fitting position, the pin terminal connects the pair of pin reception terminals with each other so as to establish the conduction between the pair of pin reception terminals, thereby forming a closed circuit.

In accordance with the power source circuit shut off device having the aforementioned configuration of the aspect (1), the second opening section is closed by the closing wall on the terminal contact position. Therefore, an operator can be protected from a danger of electric shock so that it is possible to provide the power source circuit shut off device capable of achieving protection from electric shock.

In addition, even in a case where a cover for covering the second opening section of the housing in order to ensure the safety of an operator is not provided on the housing beforehand, the second opening section is closed by the closing wall. Therefore, an amount of a resin to be used for molding the housing can be reduced so that the cost can be cut down.

In accordance with the power source circuit shut off device having the aforementioned configuration of the aspect (2), in a state that the housing is positioned at the complete fitting position at which the housing is accommodated in the second housing, the abutment shafts are brought into contact with the outer edges of the lever after the lever is rotated. In addition, in a state that the housing is positioned at the terminal contact position at which the housing is not yet accommodated in the second housing, or in the half fitting state as a state between the terminal contact position and the complete fitting position at which the housing is not yet positioned at the complete fitting position from the terminal contact position with respect to the second housing, the lever is rotated in a state that the abutment shafts are in contact with the outer edge, and thereby the housing is positioned at the complete fitting position at which the housing is accommodated in the second housing. In the conventional manner, in a case where the lever is rotated in a state that the housing is positioned at the terminal contact position or the housing and the second housing are in the half fitting state, the operation of rotating the lever is once stopped and the housing is further brought into close proximity to the second housing so as to position the housing on the complete fitting position, and after that the lever is rotated. However, contrary to the above, even when the lever is not rotated after the housing is positioned at the complete fitting position, the housing can be positioned at the complete fitting position by rotating the lever in a state that the housing is positioned at the terminal contact position or the housing and the second housing are in the half fitting state, so that the operability can be improved.

In accordance with the power source circuit shut off device having the aforementioned configuration of the aspect (3), it is possible to surely prevent forming of the closed circuit (i.e., flowing of a current) before the lever is slid from the complete fitting position so that it is possible to more surely achieve the protection from electric shock.

DETAILED DESCRIPTION OF THE EXEMPLARY EMBODIMENTS

A power source circuit shut off device according to an embodiment of the invention will be described below with reference to accompanying FIGS. 1 to 8. The power source circuit shut off device 10 is built in a power source circuit D that is adapted to supply power to a load F from a battery B as a power source and is connected to or disconnected from the power source circuit D on an as-needed basis.

Figure 1:
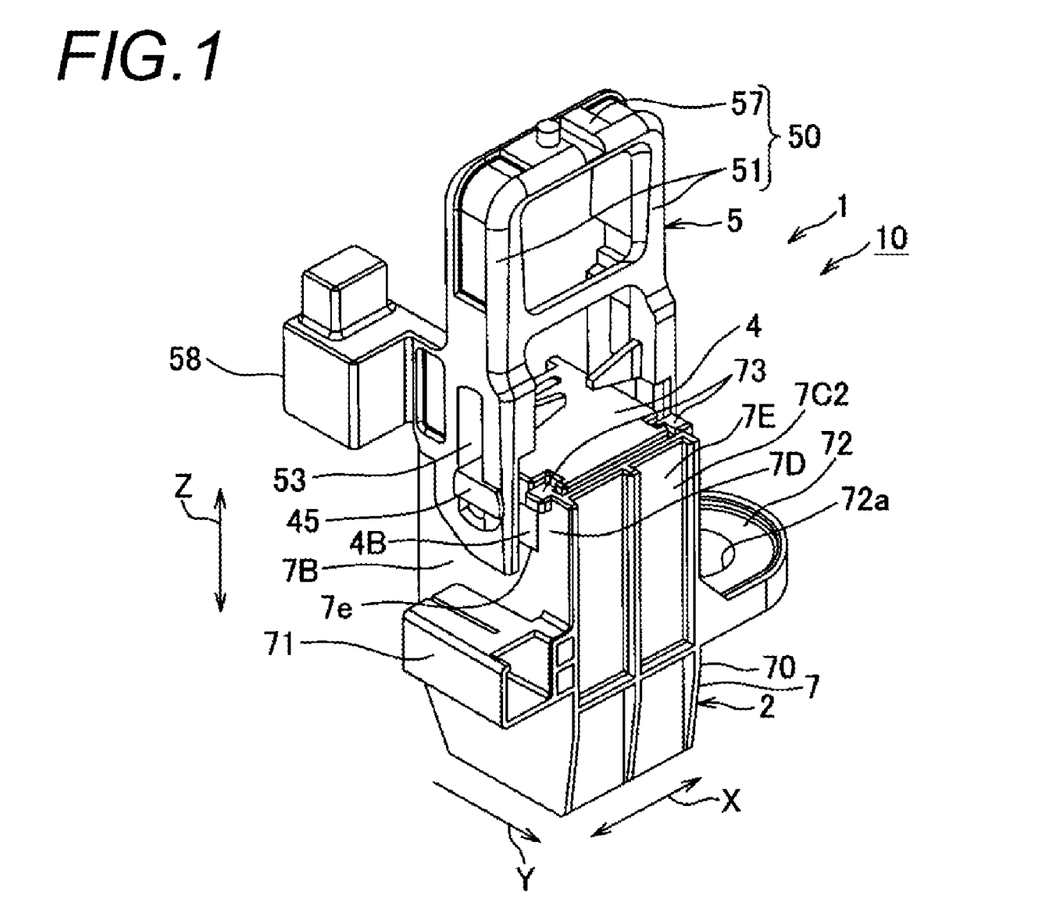
FIG. 1 is a perspective view showing a power source circuit shut off device according to a first embodiment of the invention.
Figure 2:
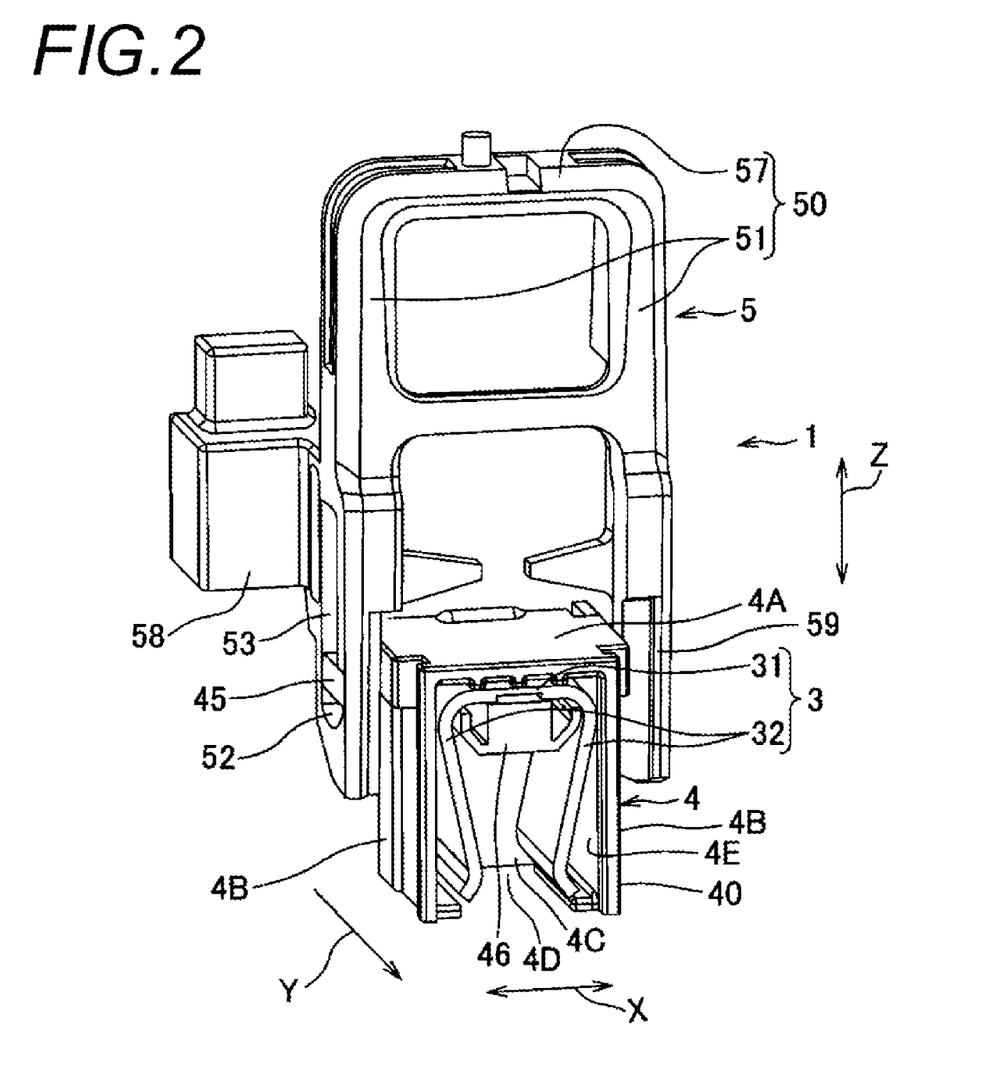
FIG. 2 is a perspective view showing a plug constituting the power source circuit shut off device shown in FIG. 1.

As shown in FIGS. 1 and 2, the power source circuit shut off device 10 includes; a plug 1 that has a housing 4 provided with a female terminal 3 as a terminal metal fitting, a body section 40 to which the female terminal 3 is attached and a pair of rotation shafts 45 as projection sections protruding from the body section 40 and a lever 5 which is provided with hole sections 52 into which the pair of rotation shafts 45 are respectively inserted and is rotatably attached to the housing 4; and a plug attachment section 2 that has a male terminal 6 as a second terminal metal fitting to be connected to the female terminal 3 and a second housing 7 to which the male terminal 6 is to be attached and in which the housing 4 is accommodated while the housing 4 is brought into close proximity thereto.

Meanwhile, in this specification, a position at which a tip portion of the male terminal 6 is first brought into contact with the female terminal 3 by bringing the housing 4 into close proximity to the housing 7 and the housing 4 is positioned before the housing 4 is accommodated in the second housing 7, is referred to as "a terminal contact position". A position at which the housing 4 is accommodated in the second housing 7 so as to be positioned after the housing 4 is further brought into close proximity to the second housing with respect to the terminal contact position, and the tip portion of the male terminal 6 is advanced to the innermost side of the male terminal 3, is referred to as "a complete fitting position". In addition, a state, between the terminal contact position and the complete fitting position, at which the housing 4 is not yet positioned at the complete fitting position from the terminal contact position with respect to the second housing 7, is referred to as "a half fitting state".

Further, the lever 5 is provided so as to be slidable with respect to the housing 4 and the second housing 7 accommodating the housing 4 in a state that the housing 4 is positioned at the complete fitting position. A position at which the lever 5 is slid with respect to the housing 4 and the second housing 7 so as to be positioned in a state that the housing 4 is positioned at the complete fitting position, is referred to as "a sliding completion position".

In addition, in a state that the housing 4 is positioned at the complete fitting position at which the housing 4 is accommodated in the second housing 7, the power source circuit D is opened (is shut off). After the housing 4 is positioned at the complete fitting position, when the lever 5 is slid with respect to the housing 4 and the second housing 7 so as to be positioned at the sliding completion position, the power source circuit D is closed (becomes in a conductive state).

The female terminal 3 is obtained in such a manner that processing of punching or bending is applied to a conductive metallic plate as shown in FIG. 2. The female terminal 3 is formed in a U-shape by a pair of connection sections 32 and a coupling section 31 coupling the connection sections 32 with each other, the connection sections 32 being formed in plates so as to have an interval therebetween and receiving, at the inside, the male terminal 6 (described later) of the plug attachment section 2 advanced therein. The pair of connection sections 32 are formed so as to be elastically deformed in the mutually approaching directions, and then the male terminal 6 is elastically connected to the pair of connection sections 32.

As shown in FIG. 2, the housing 4 has the body section 40 formed in a box shape by a ceiling wall 4A and a plurality of (three) side walls 4B and 4C continued to an edge of the ceiling wall 4A, and the pair of rotation shafts 45 as a pair of projection sections which respectively protrude from the pair of mutually opposing first side walls 4B (corresponding to outer walls) in the three side walls 4B and 4C, the rotation shafts 45 being inserted into the hole sections 52 (described later) formed on the lever 5. That is, the pair of rotation shafts 45 protrude from the body section 40 (the respective first side walls 4B). In addition, the body section 40 is provided with a first opening section 4D opened so as to allow the male terminal 6 to be advanced thereinto and a second opening section 4E opened so as to allow the female terminal 3 to be attached to the body section 40 (the housing 4). The body section 40 and the pair of rotation shafts 45 are integrally formed of an insulating resin by well known injection molding.

The second side wall 4C is provided with a terminal clamping section 46 for clamping the coupling section 31 of the female terminal 3 between it and the ceiling wall 4A, the terminal clamping section 46 protruding from the second side wall 4C.

The first opening section 4D is disposed on a position facing the ceiling wall 4A (disposed on a bottom face of the body section 40 at a second housing 7 side). The second opening section 4E is disposed on a position facing the second side wall 4C (disposed on a side face of the body section 40 perpendicular to the bottom face).

As shown in FIG. 1, the second opening section 4E is closed by a second outer wall 7C2 having, provided thereon, a second projection section 7E as a closing wall (described later) of the plug attachment section 2 in a state that the housing 4 is positioned at the terminal contact position at which the housing 4 is not yet accommodated in the second housing 7.

Directions of arrow Z shown in FIG. 1 and the like indicate a direction (an upward direction in FIG. 1) of bringing the plug 1 (the housing 4) into close proximity to the plug attachment section 2 (the second housing 7) and a direction of separating (a downward direction in FIG. 1). Directions of arrow X indicate protruding directions of a pair of abutment shafts 73 (described later) of the plug attachment section 2 that the abutment shafts 73 separate from each other, directions of the pair of rotation shafts 45 that protrude from the body section 40 (the respective side walls 4B) and a width direction of the ceiling wall 4A. A direction of arrow Y indicates a longitudinal direction of the ceiling wall 4A and a sliding direction that the lever 5 is slid with respect to the housing 4 and the second housing 7 in a state that the housing 4 is position on the complete fitting position at which the housing 4 is accommodated in the second housing 7.

As shown in FIGS. 1 and 2, the lever 5 has a lever body section 50 formed in a U-shape by a pair of plate sections 51 which are respectively overlapped with the pair of side walls 4B provided on the housing 4 and a coupling section 57 which couples the pair of plate sections 51 with each other, an outside cylindrical section 58 provided toward the outside of one of the pair of plates 51, and a conductive first detection terminal P1 (shown in FIG. 8) attached to the inside of the outside cylindrical section 58. The lever body section 50 and the outer cylindrical section 58 are integrally formed of an insulating resin by well known injection molding. The first detection terminal P1 corresponds to "a pin terminal" indicated in the claim of the invention.

The pair of plate sections 51 are provided so as to be elastically deformed in a mutually approaching direction or a mutually separating direction. Each of the plate sections 51 is provided with a hole section 52 to which the rotation shaft 45 disposed on the housing 4 is inserted, a straight guide groove 53 communicating with the hole section 52 and a slide groove 59 which is disposed at the outer edge of the plate section 51 and allows the abutment shaft 73 to be slid therein.

The slide groove 59 is formed in such a manner that an inner face to be overlapped on a first outer wall 7B of the plate section 51 is cut out and is formed along the guide groove 53.

The outer cylindrical section 58 is formed in a cylinder shape and the conductive first detection terminal P1 is attached to the inside of the outer cylindrical section 58 (i.e., the first detection terminal P1 is attached to the lever 5). When the lever 5 is positioned at the sliding completion position with respect to the housing 4 and the second housing 7, an inside cylindrical section 71 (described later) provided on the plug attachment section 2 is inserted into the outer cylindrical section 58.

Figure 3:
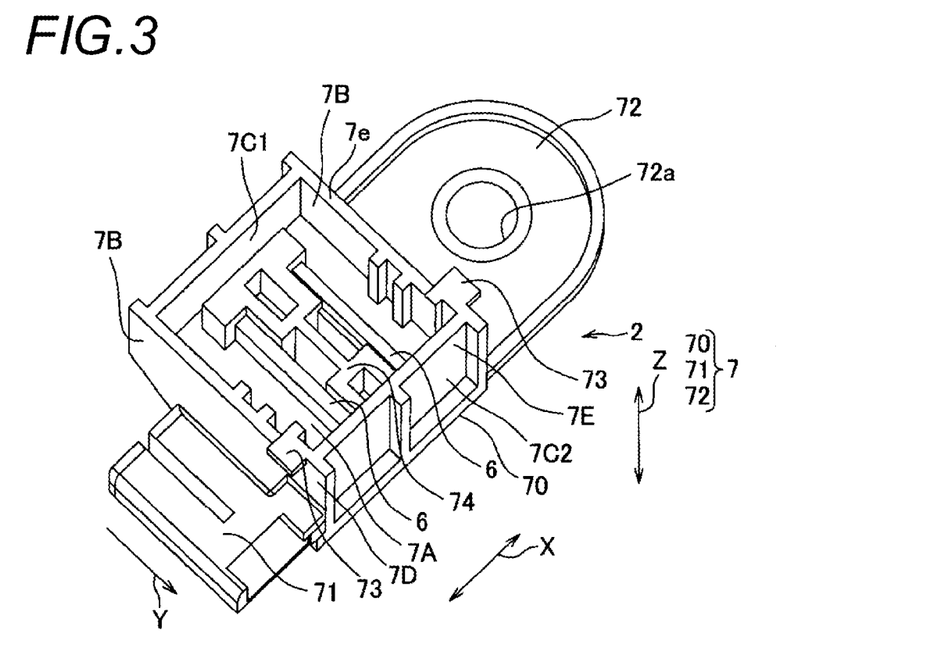
FIG. 3 is a perspective view showing a plug attachment section constituting the power source circuit shut off device shown in FIG. 1.
Figure 4:
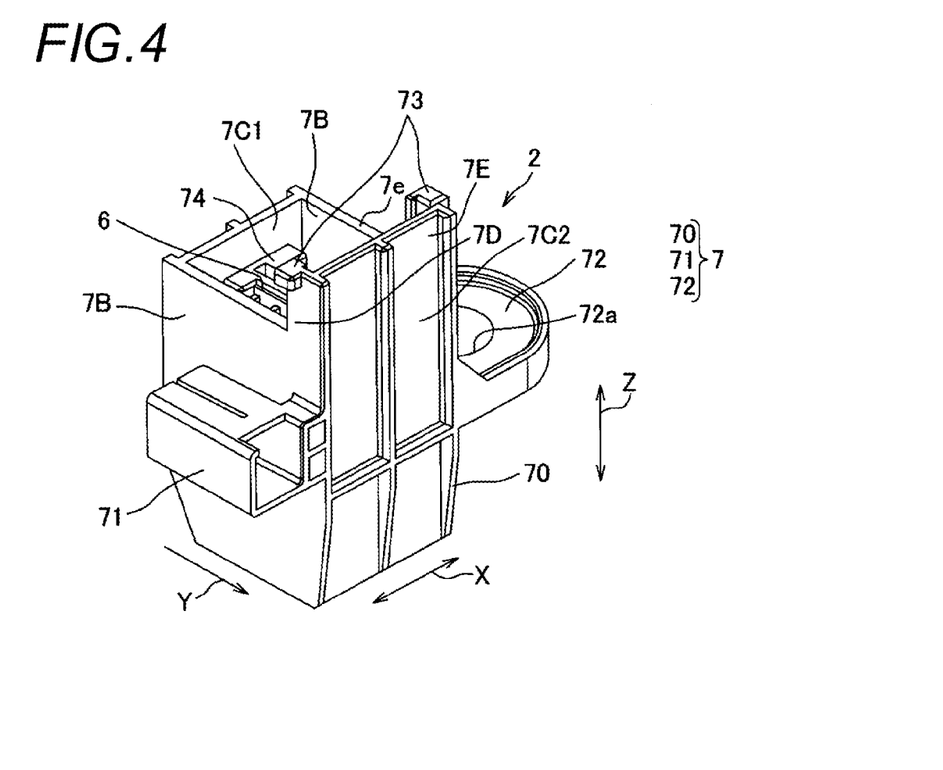
FIG. 4 is a perspective view showing the plug attachment section shown in FIG. 3.

As shown in FIGS. 3 and 4, the plug attachment section 2 has the pair of male terminals 6 to be connected with each other by the female terminal 3, the second housing 7 attached to the male terminal 6 and a pair of second detection terminals P2 (shown in FIG. 8) as a pair of pin reception terminals which are connected with each other by the first detection terminal P1 attached to the lever 5.

The pair of male terminals 6 are disposed so as to have an interval therebetween by a terminal attachment section 74 (described later) of the second housing 7. One of the pair of male terminals 6 is connected to the battery B and the other male terminal 6 is connected to the load F.

The second housing 7 has a box shaped second body section 70 having, provided thereon, an insertion hole into which the housing 4 (the body section 40) provided on the plug 1 is inserted, the inside cylindrical section 71 which is to be inserted into the inside of the outside cylindrical section 58 provided on the lever 5, and a vehicle body attachment section 72 having, provided thereon, a hole section 72a, the vehicle body attachment section 72 being overlapped on a vehicle body panel constituting a vehicle body of an automobile so as to allow the plug attachment section 2 to be attached to the vehicle body.

The second body section 70 is formed in a cylindrical shape with a bottom by a bottom wall 7A provided on a position facing the ceiling wall 4A of the body section 40, the pair of first outer walls 7B (corresponding to overlapping walls) which are vertically provided at the edges in the width direction (the direction of arrow X) of the bottom wall 7A and are respectively overlapped with the first side walls 4B of the body section 40, and a pair of outer walls 7C1 and 7C2 vertically provided at the edges in the longitudinal direction (the direction of arrow Y) of the bottom wall 7A. The second side wall 4C of the body section 40 is overlapped with one (7C1) of the pair of second outer walls 7C1 and 7C2, and the other second outer wall 7C2 is provided on a position closing the second opening section 4E of the body section 40.

A terminal attachment section 74 to which the pair of male terminals 6 are attached, is provided on the bottom wall 7A. The terminal attachment section 74 is formed in a plate and is vertically provided at the bottom wall 7A between the pair of male terminals 6.

The pair of first outer walls 7B respectively have a pair of first projection sections 7D protruding from edges 7e of the first outer walls 7B (i.e., an edge of the insertion hole) toward the plug 1, and the abutment shafts 73 provided on the respective first projection sections 7D. The inside cylindrical section 71 is provided on an outer surface of one of the pair of first outer walls 7B so as to protrude in the direction of arrow X and the vehicle body attachment section 72 is provided on an outer surface of the other first outer wall 7B so as to protrude in the direction of arrow X.

Figure 5:
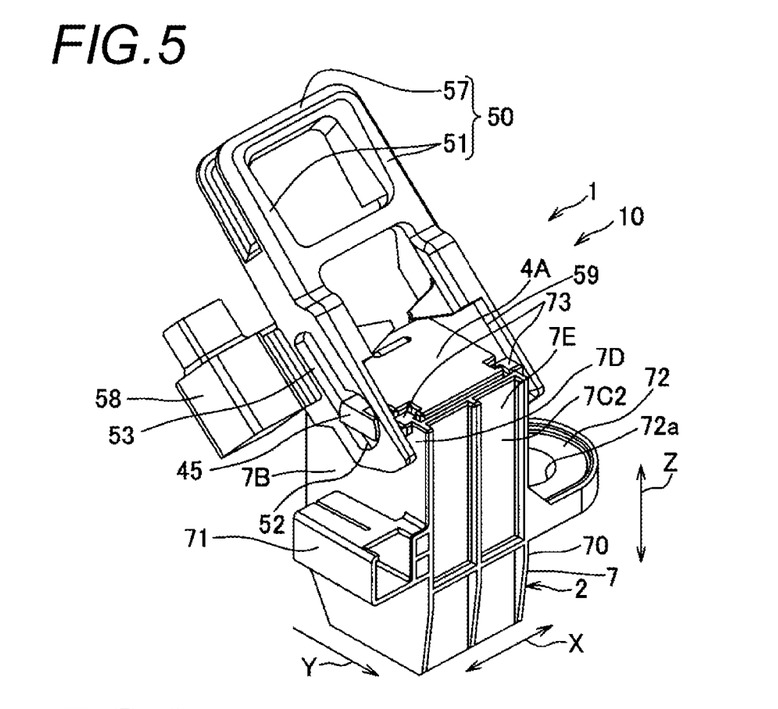
FIG. 5 is a perspective view showing a situation in which a lever is rotated in a state that a housing constituting the plug shown in FIG. 2 is positioned at a terminal contact position.

As shown in FIGS. 4 and 5, the first projection sections 7D are provided on an end section at the innermost side in the sliding direction (in the direction of arrow Y). The first projection sections 7D are provided on positions juxtaposed with the respective rotation shafts 45 at the innermost sides in the sliding direction (in the direction of arrow Y) of the rotation shafts 45 in a state that the housing 4 is positioned at the terminal contact position at which the housing is not yet accommodated in the second housing 7.

The abutment shafts 73 are provided on end sections away from the respective first outer walls 7B of the first projection sections 7D so as to protrude in the directions of mutually separating (in the directions of arrow X) from each other. The abutment shafts 73 are provided on positions where the abutment shafts 73 are in contact with the respective outer edges (i.e., the slide grooves 59) of the lever 5 when the lever 5 is rotated in a state that the housing 4 is positioned at the terminal contact position or the housing 4 and the second housing 7 are in the half fitting state. The lever 5 is further rotated in a state that the abutment shafts 73 and the outer edges (i.e., the slide grooves 59) of the lever 5 are in contact with each other, and thereby the housing 4 is positioned at the complete fitting position. In addition, when the housing 4 is positioned at the complete fitting position, the abutment shafts 73 are respectively positioned at the sides in the directions of separating more than the pair of rotation shafts 45 (in the directions of arrow Z). That is, the abutment shafts 73 are respectively positioned at the sides in the directions of separating more than the pair of rotation shafts 45 (in the directions of arrow Z) when the housing 4 is positioned at the complete fitting position. Therefore, in a case where the lever 5 is rotated in a state that the housing 4 is positioned at the complete fitting position, the abutment shafts 73 are brought into contact with the slide grooves 59 of the lever 5 after the lever 5 is rotated.

As shown in FIG. 4, the second projection section 7E as a closing wall is provided on the second outer wall 7C2 at a position between the pair of first projection sections 7D (that is, the second projection section 7E protrudes from the edge 7e of the insertion hole toward the plug 1). An end section of the second outer wall 7C2 (the second projection section 7E) away from the bottom wall 7A is provided on a position away from the bottom wall 7A more than the second projection wall 7C1. The second opening section 4E provided on the body section 40 is closed by the second outer wall 7C2 having, provided thereon, the second projection section 7E in a state that the housing 4 is positioned at the terminal contact position at which the housing 4 is not yet accommodated in the housing 7.

The inside cylindrical section 71 is formed in a cylindrical shape having an opening in the sliding direction (in the direction of arrow Y), and the pair of second detection terminals P2 are provided at the inside thereof.

Figure 8:
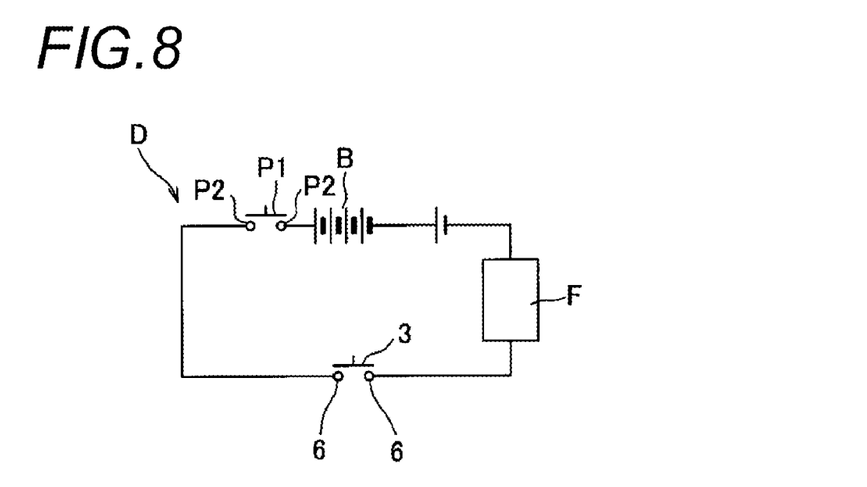
FIG. 8 is a circuit diagram showing a power source circuit having built therein the power source circuit shut off device shown in FIG. 1.

As shown in FIG. 8, the pair of second detection terminals P2 are disposed so as to have an interval therebetween (separated from each other). In addition, one of the detection terminals P2 is connected to the battery B, and the other of the detection terminals P2 is connected to the load F. That is, the second detection terminals P2 are provided on a power source line from the battery B to the load F. When the lever 5 is positioned at the sliding completion position, the pair of second detection terminals P2 are connected with each other by the first detection terminal P1 so that the first detection terminal P1 is electrically connected to both of the second detection terminals P2, thereby the power source circuit D is closed (the closed circuit is formed).

An assembling sequence of the aforementioned power source circuit shut off device 10 is described below. First, one of the pair of male terminals 6 is connected to the battery B via an electric wire and the other male terminal 6 is connected to the load F via an electric wire. The vehicle body attachment section 72 of the plug attachment section 2 and the vehicle body panel are overlapped with each other, and a bolt is inserted into the hole section 72a of the vehicle body attachment section 72 so as to be screw-engaged with a nut provided on the vehicle panel, and thereby the plug attachment section 2 is left to be attached to the vehicle body (the vehicle body panel).

Next, the female terminal 3 is inserted into the second opening section 4E of the body section 40 so as to cause the coupling section 31 of the female terminal 3 to be clamped between the terminal clamping section 46 and the ceiling wall 4A. After the female terminal 3 is attached to the body section 40 (the housing 4), the pair of plate sections 51 of the lever 5 are expanded so as to cause the plate sections 51 to be separated from each other, and then the rotation shafts 45 are inserted into the respective holes 52 of the lever 5. Thus, the plug 1 is assembled (shown in FIG. 2).

Next, the ceiling wall 4A and the bottom wall 7A of the plug attachment section 2 are positioned at facing positions, and then the plug 1 (the housing 4) and the plug attachment section 2 (the second housing 7) are brought into close proximity to each other so as to overlap the second side wall 4C and the second outer wall 7C1 with each other. Thereby, the tip portion of the male terminal 6 is (first) brought into contact with the female terminal 3, and then the housing 4 is positioned at the terminal contact position at which the housing 4 is not yet accommodated in the second housing 7 (shown in FIG. 1). That is, in a state that the housing 4 is positioned at the terminal contact position, the pair of male terminal sections 6 are connected with each other by the female terminal 3. At that time, the second opening section 4E is closed by the second outer wall 7C2 provided with the second projection section 7E as the closing wall.

In addition, the lever 5 is rotated with respect to the housing 4 and the second housing 7 in a state that the housing 4 is positioned at the terminal contact position. Thereby, the abutment shafts 73 of the plug attachment section 2 are brought into contact with the slide grooves 59 of the lever 5 and the lever 5 is further rotated in a state that the abutment shafts 73 and the respective slide grooves 59 are in contact with each other. At the same time, the plug 1 (the housing 4) is further brought into close proximity to the plug attachment section 2 (the second housing 7) so as to cause the tip portion of the male terminal 6 to be advanced to the innermost side of the female terminal 3. Then, the housing 4 is accommodated in the second housing 7 so that the housing 4 is positioned at the complete fitting position.

Alternately, the lever 5 can be further rotated with respect to the housing 4 and the second housing 7 after the plug 1 (the housing 4) and the plug attachment section 2 (the second housing 7) are further brought into close proximity to each other in a state that the housing 4 is positioned at the terminal contact position. At that time, when the housing 4 is in the half fitting state with respect to the second housing 7, the abutment shafts 73 of the plug attachment section 2 are brought into contact with the slide grooves 59 of the lever 5, and the lever 5 is further rotated in a state that the abutment shafts 73 and the slide grooves 59 are in contact with each other so that the housing 4 is positioned at the complete fitting position. Alternately, when the housing 4 is positioned at the complete fitting position with respect to the second housing 7, the abutment shafts 73 of the plug attachment section 2 are brought into contact with the slide grooves 59 of the lever 5 after the lever 5 is rotated, and thereby the housing is positioned at the complete fitting position.

Figure 6:
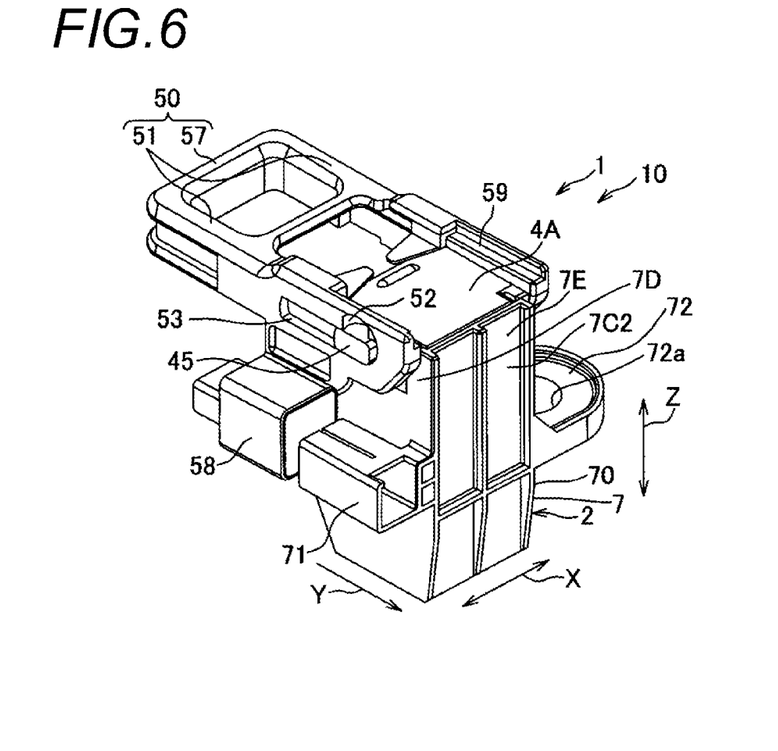
FIG. 6 is a perspective view showing a condition that the housing constituting the plug shown in FIG. 2 is positioned at a complete fitting position.
Figure 7:
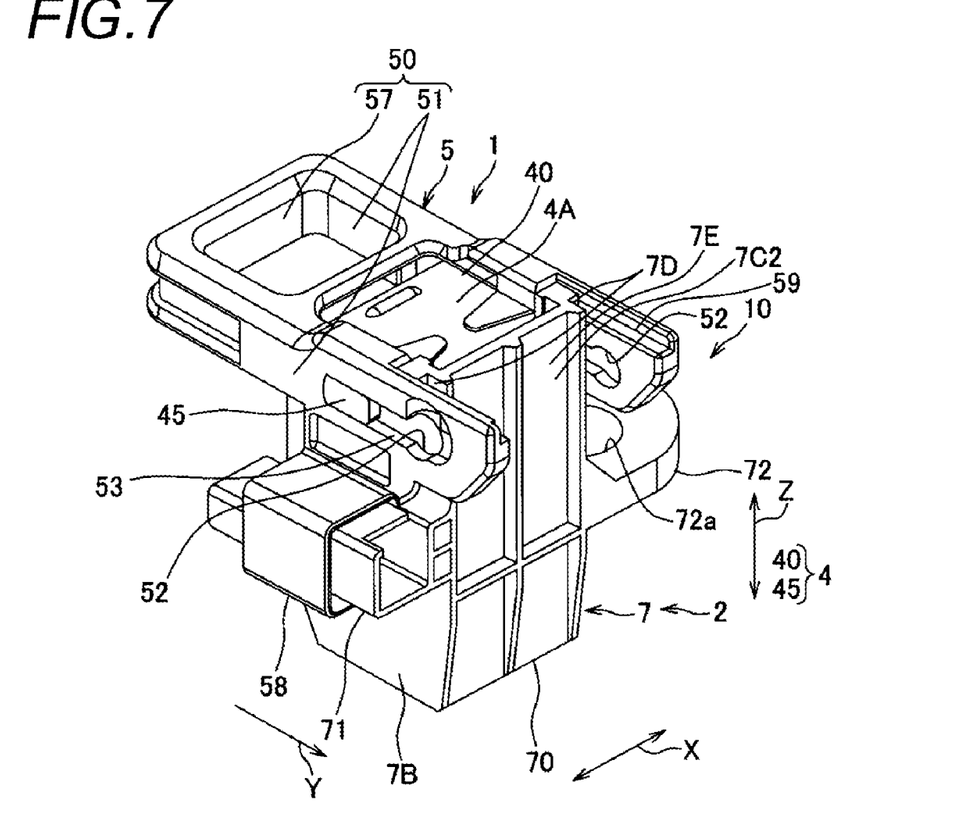
FIG. 7 is a perspective view showing a condition that the lever constituting the plug shown in FIG. 2 is positioned at a sliding completion position.

Thus, in a state that the housing 4 is positioned at the complete fitting position, the abutment shafts 73 are positioned at the sides in the separating directions (in the directions of arrow Z) (shown in FIG. 6).

In addition, in a state that the housing 4 is positioned at the complete fitting position, the pair of second detection terminals P2 are separated from each other. Therefore, since the power source circuit D is opened, a current does not flow from the male terminal 6 to the female terminal 3.

The lever 5 is further slid in a state that the housing 4 is positioned at the complete fitting position. With this, the rotation shafts 45 are moved (slid) along the guide grooves 53 provided on the lever 5 and the abutment shafts 73 are moved (slid) along the slide grooves 59 so that the inside cylindrical section 71 provided on the second housing 7 is inserted into the outside cylindrical section 58 provided on the lever 5 so as to cause the first detection terminal P1 to connect the pair of second detection terminals P2 with each other. At the same time, the lever 5 is positioned at the sliding completion position (shown in FIG. 7). When the lever 5 is thus positioned at the sliding completion position as in the above, the pair of second detection terminals P2 are electrically connected with each other by the first detection terminal P1, and thereby the power source circuit D is closed. Therefore, a current flows from the male terminal 6 to the female terminal 3.

The power source circuit shut off device 1 according to the above described embodiment includes the plug 1 having the female terminal 3 as the terminal metal fitting, the housing 4 to which the female terminal 3 is attached and the lever 5 which is to be rotatably attached to the housing 4, and the plug attachment section 2 having the male terminal 6 as the second terminal metal fitting which is to be connected to the female terminal 3 and the second housing 7 to which the male terminal 6 is to be attached. In the housing 4, the first opening section 4D which allows the male terminal 6 to be advanced thereinto, is provided on its bottom face at the second housing 7 side, and the second opening section 4E which allows the female terminal 3 to be attached to the housing 4 is provided on its side face perpendicular to the bottom face. The housing 4 is brought into close proximity to the second housing 7, and the tip portion of the male terminal 6 is advanced into the innermost side of the female terminal 3 from the terminal contact position at which the tip portion of the male terminal is first brought into contact with the female terminal 3 before the housing 4 is accommodated in the second housing 7 by being brought into close proximity thereto, and thereby the housing 4 is accommodated in the second housing 7 so as to be positioned at the complete fitting position at which the second opening section 4E is closed by the second housing 7. The second projection section 7E as a closing wall which closes the second opening section 4E in a state that the housing 4 is positioned at the terminal contact position is provided so as to protrude from the edge 7e of the insertion hole of the second housing 7 through which the housing 4 is accommodated. Here, the second opening section 4E is closed by the second projection section 7E on the terminal contact position. Therefore, an operator can be protected from the danger of electric shock so that it is possible to provide the power source circuit shut off device 1 capable of achieving protection from electric shock.

To be specific, even in a case where the female terminal 3 and the male terminal 6 are connected with each other, the closed circuit is not formed unless the second detection terminals P2 as the pair of pin reception terminals are connected with each other by the first detection terminal P1 as a pin terminal. In the power source circuit shut off device 1 of the embodiment, in a case where, for example, the power source circuit D is short-circuited by water or a piece of iron so as to form the closed circuit, the second opening section 4E is closed by the second projection section 7E as the closing wall at the terminal contact position, because the second housing 7 is provided with the second projection section 7E as the closing wall which closes the second opening section 4E in a state that the housing 4 is positioned at the terminal contact position. Therefore, an operator is protected from the danger of electric shock so that it is possible to provide the power source circuit shut off device 1 capable of achieving protection from electric shock.

In addition, even in a case where a cover section that covers the second opening section 4E in order to ensure the safety of an operator is not provided on the housing 4 beforehand, the second opening section 4E is closed by the second projection section 7E as the closing wall. Therefore, an amount of a resin to be used for molding the housing 4 can be reduced so that the cost can be cut down.

Further, the power source circuit shut off device 1 according to the aforementioned embodiment includes the lever 5 which is rotatably attached to the housing 4. The housing 4 is provided with the pair of rotation shafts 45 as the projection sections which protrude in the directions (the directions of arrow X) of mutually separating from each other so as to allow the lever 5 to be attached to the housing 4. The plug attachment section 2 is provided with the pair of abutment shafts 73 which protrude in the protruding directions (the directions of arrow X) of mutually separating from the first outer walls 7B as the overlapping walls which are overlapped with the first side walls 4B as the outer walls having the respective rotation shafts 45 provided thereon. The abutment shafts 73 are provided on positions which are brought into contact with the respective outer edges of the lever 5 when the lever 5 is rotated from the terminal contact position. The lever 5 is provided so as to be rotated in a state that the abutment shafts 73 are in contact with the outer edges, and the abutment shafts 73 are positioned at the sides in the directions (the directions of arrow Z) of separating more than the rotation shafts 45. With this, the abutment shafts 73 are brought into contact with the slide grooves 59 of the lever 5 after the lever 5 is rotated in a state that the housing 4 is positioned at the complete fitting position at which the housing 4 is accommodated in the second housing 7. In addition, in a state that the housing 4 is positioned at the terminal contact position at which the housing 4 is not yet accommodated in the second housing 7 or in the half fitting state, as a state between the terminal contact position and the complete fitting position, at which the housing 4 is not yet positioned at the complete fitting position from the terminal contact position with respect to the second housing 7, the lever 5 is rotated in a state that the abutment shafts 73 are in contact with the outer edges (the slide grooves 59), and thereby the housing 4 is positioned at the complete fitting position at which the housing 4 is accommodated in the second housing 7. In the related manner, the operation of rotating the lever 105 is once stopped in a case where the lever 105 is rotated in a state that the housing 104 is positioned at the terminal contact position or the housing 104 and the second housing 107 are in the half fitting state and the housing 104 is further brought into close proximity to the second housing 107 so as to position the housing 104 on the complete fitting position, and after that the lever 105 is rotated. However, in the aforementioned embodiment, even when the lever 5 is not rotated after the housing 4 is positioned at the complete fitting position, the housing 4 can be positioned at the complete fitting position by rotating the lever 5 in a state that the housing is positioned at the terminal contact position or the housing 4 and the second housing 7 are in the half fitting state, so that the operability can be improved.

Moreover, in the power source circuit shut off device 1 according to the aforementioned embodiment, the lever 5 is disposed to be slidable with respect to the housing 4 and the second housing 7 accommodating the housing 4 in a state that the housing 4 is positioned at the complete fitting position. The power source circuit shut off device 1 includes the pair of second detection terminals P2 as the pin reception terminals which are disposed so as to have an interval therebetween on the power source line from the battery B to the load F and are to be attached to the second housing 7, and the first detection terminal P1 as the pin terminal which is attached to the lever 5 and is adapted to connect the pair of second detection terminals P2 with each other. When the lever 5 is slid in a state that the housing 4 is positioned at the complete fitting position, the first detection terminal P1 connects the pair of second detection terminals P2 with each other so as to establish the conduction between the pair of second detection terminals P2, thereby forming the closed circuit. Therefore, it is possible to surely prevent forming of the closed circuit (i.e., flowing of a current) before the lever 5 is slid from the complete fitting position so that it is possible to more surely achieve the protection from electric shock.

While, in the above described embodiment, the lever 5 is provided, the invention is not limited to this configuration and the lever 5 can be omitted. In addition, while, in the above described embodiment, the first detection terminal P1 as the pin terminal and the second detection terminals P2 as the pin reception terminals are provided, the invention is not limited to that and the first detection terminal P1 and the second detection terminals P2 as the pin reception terminals can be omitted.

The above described embodiment just indicates a representative aspect of the invention so that the invention is not limited to the embodiment. That is, various changes can be made without departing from the essence of the invention.

As described above, in accordance with the power source circuit shut off device according to the invention, it is possible to prevent an operator from receiving electric shock.

What is claimed is:

1. A power source circuit shut off device comprising:
   a plug having a terminal metal fitting and a housing to which the terminal metal fitting is attached; and
   a plug attachment section having a second terminal metal fitting to be connected to the terminal metal fitting and a second housing to which the second terminal metal fitting is attached,
   wherein a first opening section for inserting the second terminal metal fitting is provided at a bottom face of the housing at a second housing side;
   wherein the housing has a second opening section for attaching the terminal metal fitting to the housing, the second opening section being provided on a side face of the housing perpendicular to the bottom face;
   wherein the housing is brought into close to the second housing, and a tip portion of the second terminal metal fitting is advanced into the innermost side of the terminal metal fitting from a terminal contact position at which the tip portion of the second terminal metal fitting is first brought into contact with the terminal metal fitting before the housing is accommodated in the second housing, and thereby the housing is positioned at a complete fitting position at which the housing is accommodated in the second housing and the second opening section is closed by the second housing; and
   wherein a closing wall is provided so as to protrude from an edge of an insertion hole through which the housing is inserted into the second housing, and closes the second opening section in a state that the housing is positioned at the terminal contact position.

2. The power source circuit shut off device according to claim 1, wherein a lever is rotatably attached to the housing;
   wherein a pair of projection sections is provided on the housing and protrudes in the directions of mutually separating from each other for attaching the lever to the housing;
   wherein a pair of abutment shafts is provided on the plug attachment section and protrudes in the directions of mutually separating from overlapping walls overlapped with outer walls respectively having the projection sections;

wherein the abutment shafts are provided at positions which are brought into contact with outer edges of the lever when the lever is rotated from the terminal contact position;

wherein the lever is provided so as to be rotated in a state that the abutment shafts are in contact with the outer edges; and wherein the abutment shafts are positioned at the sides in the directions of separating away more than the projection sections in a state that the housing is positioned at the complete fitting position.

3. The power source circuit shut off device according to claim 1, wherein the lever is provided so as to be slidable with respect to the housing and the second housing accommodating the housing in a state that the housing is positioned at the complete fitting position, and a pair of pin reception terminals are disposed so as to have an interval therebetween on a power source line from a battery to a load and are attached to the second housing;

wherein a pin terminal is attached to the lever and connects the pair of pin reception terminals with each other; and wherein when the lever is slid in a state that the housing is positioned at the complete fitting position, the pin terminal connects the pair of pin reception terminals with each other so as to establish the conduction between the pair of pin reception terminals, thereby forming a closed circuit.

* * * * *